US 9,407,948 B2

(12) United States Patent
Silva et al.

(10) Patent No.: US 9,407,948 B2
(45) Date of Patent: *Aug. 2, 2016

(54) TELEPHONY SERVICES FOR PROGRAMMABLE MULTIMEDIA CONTROLLER

(71) Applicant: Savant Systems, LLC, Hyannis, MA (US)

(72) Inventors: Michael C. Silva, East Sandwich, MA (US); Robert P. Madonna, Osterville, MA (US); Arthur A. Jacobson, Centerville, MA (US)

(73) Assignee: Savant Systems, LLC, Hyannis, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/189,475

(22) Filed: Feb. 25, 2014

(65) Prior Publication Data

US 2014/0176797 A1    Jun. 26, 2014

Related U.S. Application Data

(63) Continuation of application No. 11/519,981, filed on Sep. 12, 2006, now Pat. No. 8,687,037.

(51) Int. Cl.
*H04N 21/41* (2011.01)
*H04M 1/247* (2006.01)
(Continued)

(52) U.S. Cl.
CPC ............ *H04N 21/4126* (2013.01); *H04L 12/66* (2013.01); *H04M 1/247* (2013.01);
(Continued)

(58) Field of Classification Search
CPC ............ H04M 1/247; H04M 1/27455; H04M 19/041; H04M 2250/00; H04N 7/142; H04N 7/147; H04L 12/66

USPC .............. 379/90.01, 90.05, 110.01; 715/711, 715/814, 812, 810, 705, 708, 859; 348/14.01, 14.02
See application file for complete search history.

(56) References Cited

U.S. PATENT DOCUMENTS 6,215,417 B1  4/2001  Krass et al.
6,515,695 B1  2/2003  Sato et al.
(Continued)

FOREIGN PATENT DOCUMENTS

EP    0717345 A1   6/1996
EP    1480422 A2  11/2004
(Continued)

OTHER PUBLICATIONS

International Search Report mail date Dec. 2, 2008 for International Application No. PCT/US2007/019795, International file date Dec. 9, 2007 by Savant Systems, LLC, 15 pages.
(Continued)

*Primary Examiner* — Melur Ramakrishnaiah
(74) *Attorney, Agent, or Firm* — Cesari and McKenna, LLP; James A. Blanchette

(57) ABSTRACT

In one embodiment, a programmable multimedia controller controls electronic devices, including display devices. A remote control communicates with the programmable multimedia controller. An on screen display is displayed on a selected one of the display devices. The on screen display enables the selected one of the display devices to function as a virtual telephone that is user-operable to initiate outgoing telephone calls and to answer incoming telephone calls. When an outgoing telephone call or incoming telephone call is in progress, the on screen display shows text or graphics related to the outgoing telephone call or the incoming telephone call. The on screen display is overlaid on another video signal which is already being displayed on the selected one of the display devices.

24 Claims, 8 Drawing Sheets

(51) Int. Cl.
  *H04M 1/2745* (2006.01)
  *H04M 19/04* (2006.01)
  *H04N 7/14* (2006.01)
  *H04L 12/66* (2006.01)

(52) U.S. Cl.
  CPC ........ *H04M1/27455* (2013.01); *H04M 19/041* (2013.01); *H04N 7/142* (2013.01); *H04N 7/147* (2013.01); *H04M 2250/22* (2013.01)

(56) References Cited

U.S. PATENT DOCUMENTS

| | | | |
|---|---|---|---|
| 6,563,430 | B1 | 5/2003 | Kemink et al. |
| 6,765,557 | B1 | 7/2004 | Segal et al. |
| 7,024,180 | B2 * | 4/2006 | Waters ................ G09F 3/00 455/412.1 |
| 7,064,675 | B2 | 6/2006 | Zigmond et al. |
| 7,092,495 | B2 | 8/2006 | Kraft et al. |
| 7,363,028 | B2 | 4/2008 | de Clerq et al. |
| 7,508,816 | B1 * | 3/2009 | Everson et al. ............... 370/352 |
| 7,565,680 | B1 | 7/2009 | Asmussen |
| 9,153,125 | B2 | 10/2015 | Madonna et al. |
| 2002/0021790 | A1 * | 2/2002 | Corbett et al. ............ 379/93.23 |
| 2003/0101459 | A1 | 5/2003 | Edson |
| 2004/0117834 | A1 | 6/2004 | Karaoguz et al. |
| 2004/0163073 | A1 * | 8/2004 | Krzyzanowski et al. ..... 717/107 |
| 2004/0215816 | A1 | 10/2004 | Hayes et al. |
| 2005/0074018 | A1 | 4/2005 | Zintel et al. |
| 2005/0094610 | A1 | 5/2005 | de Clerq et al. |
| 2005/0195779 | A1 | 9/2005 | Matsumoto |
| 2006/0038794 | A1 | 2/2006 | Shneidman |
| 2006/0092037 | A1 | 5/2006 | Neogi et al. |
| 2006/0103623 | A1 | 5/2006 | Davis |
| 2007/0070188 | A1 * | 3/2007 | Shyu ......................... 348/14.11 |
| 2007/0081196 | A1 | 4/2007 | Divine et al. |
| 2007/0142022 | A1 | 6/2007 | Madonna et al. |
| 2007/0186002 | A1 | 8/2007 | Campbell et al. |
| 2007/0291736 | A1 * | 12/2007 | Furlong et al. ............... 370/352 |

FOREIGN PATENT DOCUMENTS

| | | |
|---|---|---|
| EP | 1511281 A1 | 3/2005 |
| GB | 2407731 A | 5/2005 |
| JP | 06-224991 A | 5/1994 |
| JP | 07-264298 A2 | 10/1995 |
| JP | 2000-138765 A | 5/2000 |
| JP | 2001-285419 A | 10/2001 |
| JP | 2006-114959 A | 4/2006 |
| WO | WO-00/48409 A2 | 8/2000 |
| WO | WO-02/075517 A2 | 9/2002 |
| WO | WO-2005/078676 A2 | 8/2005 |

OTHER PUBLICATIONS

"Notification of Transmittal of the International Search Report and the Written Opinion of the International Searching Authority, or the Declaration," International Filing Date: Sep. 12, 2007, International Application No. PCT/US2007/019795, Applicant: Savant Systems LLC, Date of Mailing: Feb. 12, 2008, pp. 1-15.

U.S. Appl. No. 11/519,981, filed Sep. 12, 2006 by Michael C. Silva et al. for a Telephony Services for Programmable Multimedia Controller, pp. 1-18.

* cited by examiner

TELEPHONY SERVICES FOR PROGRAMMABLE MULTIMEDIA CONTROLLER

RELATED APPLICATIONS

This application is a continuation of U.S. patent application Ser. No. 11/519,981 entitled "Telephony Services for a Programmable Multimedia Controller", filed on Sep. 12, 2006, now issued as U.S. Pat. No. 8,687,037, which is hereby incorporated by reference in its entirety.

This application is also related to U.S. patent application Ser. No. 11/314,664, entitled "System and Method for a Programmable Multimedia Controller", filed Dec. 20, 2005, and U.S. patent application Ser. No. 11/314,112, entitled "Programmable Multimedia Controller With Programmable Services", filed Dec. 20, 2005, now issued as U.S. Pat. No. 9,153,125, both of which are hereby incorporated by reference in their entireties.

BACKGROUND OF THE INVENTION

1. Field of the Invention

The present invention relates generally to the fields of multimedia and communications and, more specifically, to a programmable multimedia controller for home, commercial, professional audio or video, broadcast or film studio, security, automation or other use which is capable of interfacing with, controlling and managing a wide variety of audio, video, telecommunications, data communications and other devices.

2. Background Information

Many advanced telephony services developed within the past 25 years or so, including two-party video calls, videoconferencing and voicemail, originally required customers to acquire special equipment (e.g., a videoconferencing system, a voicemail system attached to a PBX, etc.) and the requisite network bandwidth to support the services. In the case of voicemail, telecommunications carriers eventually began to offer that service to residential and wireless subscribers by provisioning their central offices with large systems that could support tens of thousands of subscribers. Telecommunications carriers, prepaid calling card companies and others profited by deploying voicemail services because subscribers tend to make many additional calls and incur substantial minutes of use in connection with voicemail. Text messaging also emerged as a profitable offering which could be easily deployed by wireless carriers and, accordingly, became widely available.

However, video calls and videoconferencing have not received similar treatment in the marketplace. A major reason for this difference is that video calls and videoconferencing have historically required special, often expensive, equipment on the premises of each subscriber. That is, each subscriber must have a video camera, a microphone, a display, some type of controller and appropriate bandwidth to the public switched telephone network (PSTN). Due to the unwillingness of most non-business subscribers to pay the significant costs associated with the necessary equipment, especially in light of expected limited use, video calling and videoconferencing did not historically achieve the broad-based adoption and usage of voicemail.

More recently, some companies have introduced internet-based services which allow persons to make video calls or hold videoconferences using the Internet as opposed to the PSTN. The iChat® service offered by Apple Computer, Inc. and Instant Messenger with video by AOL are two examples of such a service. While those services generally perform well, they do require a subscriber to have certain computer hardware and software, as well as experience using a computer, in order to function. More importantly, those services are typically based on a particular technology claimed as proprietary by a vendor and not on an open industry standard. The absence of open standards creates barriers of incompatibility between competing vendors' offerings, which tends to limit adoption and usage.

SUMMARY OF THE INVENTION

In brief summary, the present invention provides a multimedia controller which may be programmed to provide advanced, diverse telephony services including video phone calls, audio and videoconferencing, voicemail, answering machine and text messaging functions among others. The present invention offers user interfaces which mimic the functions and features of conventional telephone handsets, answering machines or other familiar devices, thus enabling users to operate and enjoy advanced telephony services by relying primarily on knowledge that they already have about standard household appliances and components. More specifically, using the present invention, a user who knows how to use a television and a conventional telephone handset or simple remote control may place or receive conference calls, video calls or video conferences. In this fashion, the present invention enables users to largely avoid complicated configuration or setup procedures as well having to learn arcane commands.

In accordance with another aspect of the present invention, a touchscreen which is interfaced with the multimedia controller may be used as a virtual telephone, intercom or other communication or control device. By displaying a simulated telephone keypad, intercom controls or other appropriate controls on the touchscreen, a user may access both basic and advanced features and functions in a way that is intuitive and familiar.

In accordance with yet another aspect of the present invention, other devices including MP3 players or simple electro-mechanical remote controls may be interfaced with the multimedia controller and used to control various telephony or other services.

In accordance with one aspect of the present invention, desired telephony services may be readily programmed or customized through a graphical programming environment supported by a general purpose computer which forms a portion of the multimedia controller or standing alone.

BRIEF DESCRIPTION OF THE DRAWINGS

The invention description below refers to the accompanying drawings, of which.

DETAILED DESCRIPTION OF AN
ILLUSTRATIVE EMBODIMENT

Figure 1:
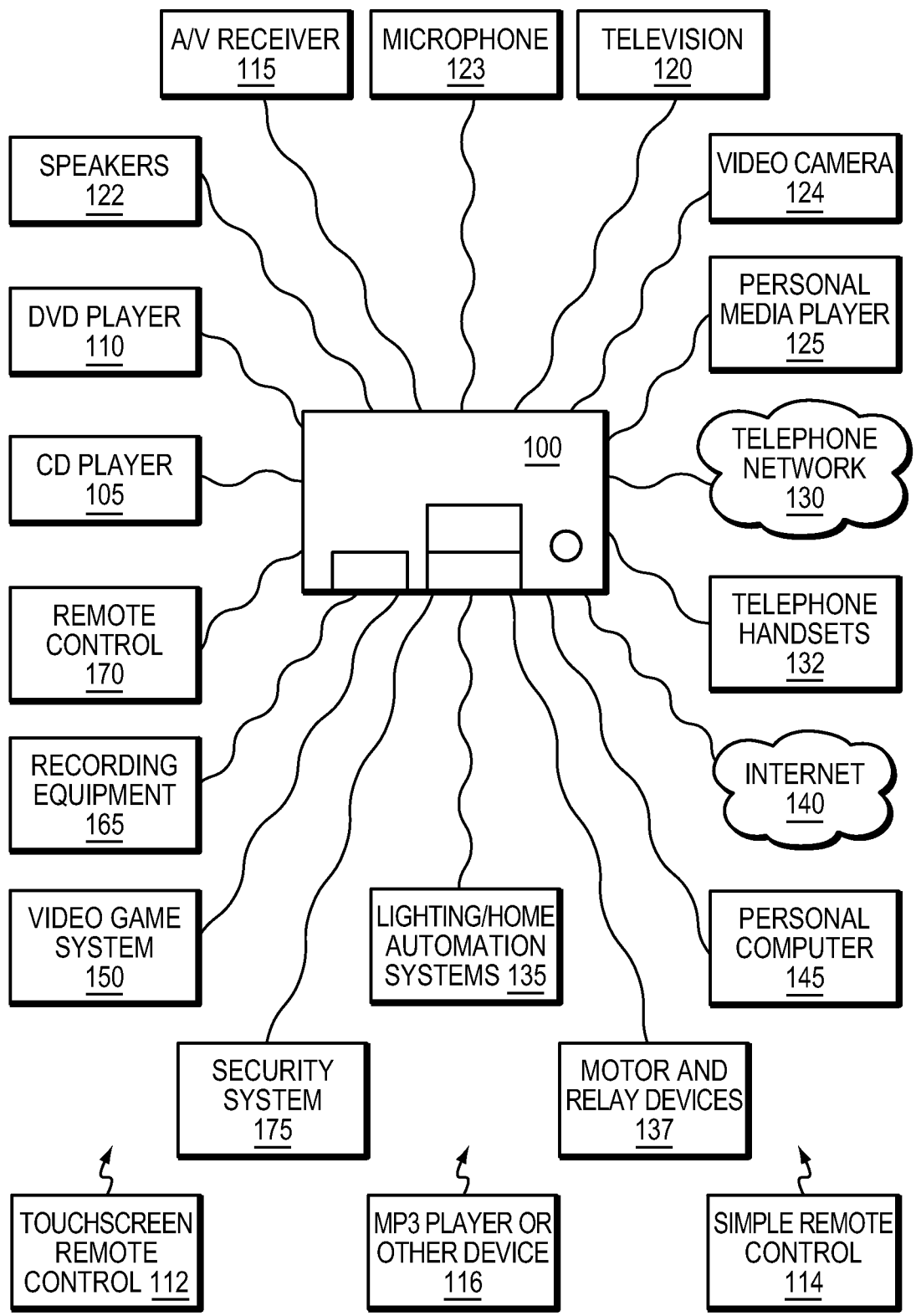
FIG. 1 is block diagram of a programmable multimedia controller, interconnected to a number of devices, according to an illustrative embodiment of the present invention.

FIG. 1 is a block diagram of a programmable multimedia controller 100, interconnected to a number of devices, according to an illustrative embodiment of the present invention. The term "programmable multimedia controller" should be interpreted broadly as a device capable of controlling, switching data between, and/or interoperating with a variety of electronic devices, such as audio, video, telephony, data, security, motor-driven, relay-driven, and/or other types of electronic devices. By interacting with these devices the programmable multimedia controller may implement an integrated multimedia control solution.

In the illustrative embodiment, the programmable multimedia controller 100 is connected to a wide range of audio/video components, for example, a compact disk (CD) player 105, a digital versatile disc (DVD) player 110, an audio/video receiver 115, a television 120, a personal media player 125, speakers 122, a microphone 123, and/or a video camera 124. The programmable multimedia controller may also be connected to telephony devices such as a telephone network 130 and telephone handsets 132. The telephone network 130 may be a publicly switched telephone network (PSTN), an Integrated Services Digital Network (ISDN) or other communications network.

In addition, the programmable multimedia controller may intercommunicate with variety of light and/or home automation systems 135. These devices may operate via the X10 protocol developed by Pico Electronics, the INSTEON™ protocol developed by SmartHome, Inc, the CEBus standard managed by the CEBus Industry Council, or another well known home automation or control protocol. Similarly the controller may be connected to motor and/or relay operated devices 137 that may include, for example, a heating, ventilation and air conditioning system (HVAC) system, an irrigation system, an automatic shade or blind system, an electronic door lock, or other types of devices.

A computer network, such as the Internet 140, is connected to the multimedia controller. In addition, a personal computer (PC) 145, video game systems 150, home recording equipment 165 or other devices may also be connected. Further, one or more remote control units 170 may be provided to manage the controller's functionality, and/or to control devices connected to the controller. Such remote control units may be interconnected to the controller via a wired network connection, an infra-red link, a radio-frequency link, a Bluetooth™ link, a ZigBee™ link or another appropriate data connection. Examples of such remote control units include a touchscreen remote control 112, a simple remote control 114, which may be electromechanical, and an MP3 player or other device 116.

Figure 2:
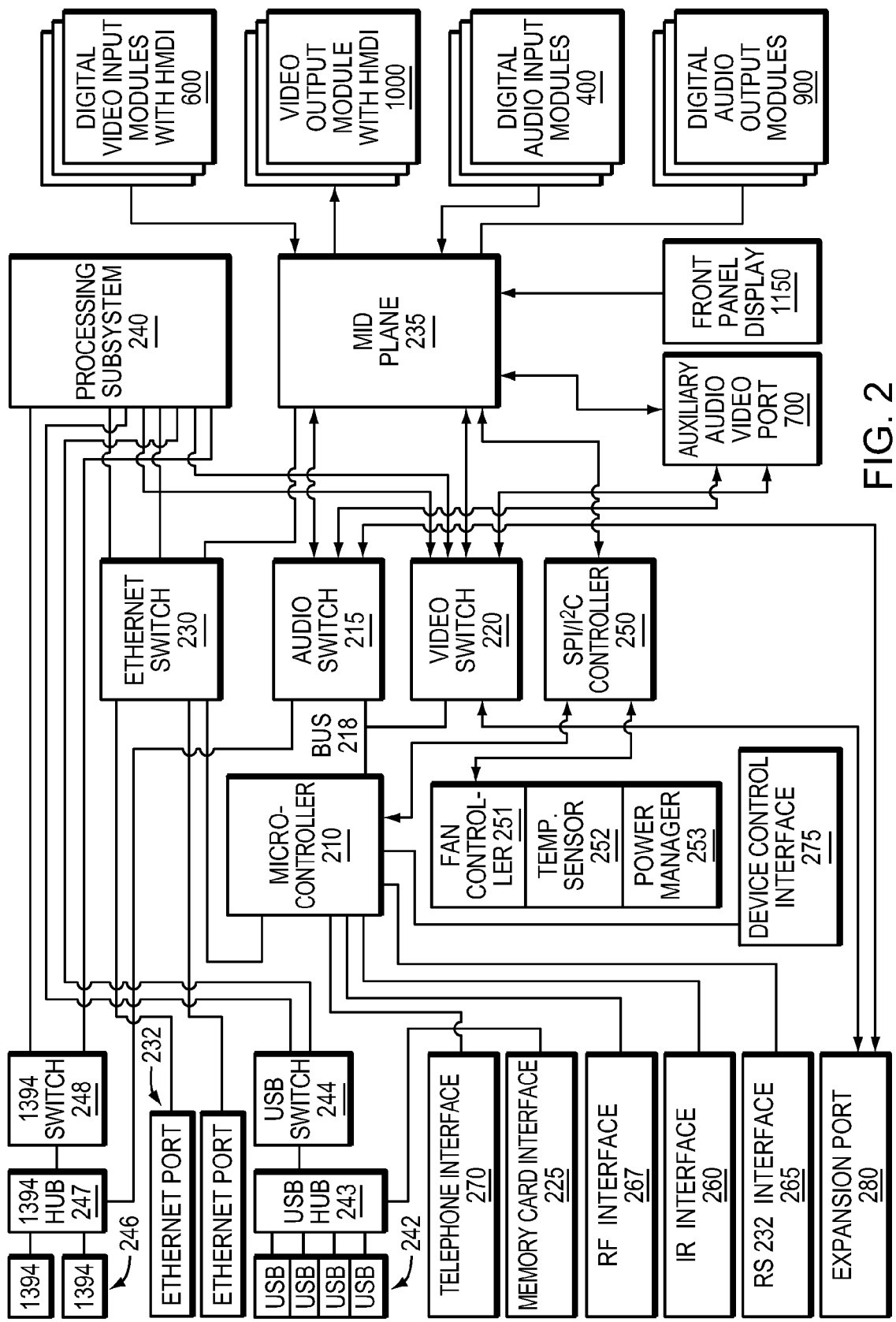
FIG. 2 is a schematic block diagram showing the high-level hardware architecture of the multimedia controller of FIG. 1.

FIG. 2 is a schematic block diagram showing a high-level hardware architecture of the programmable multimedia controller. The various components shown may be arranged on a "motherboard" of the controller, or on a plurality of cards interconnected by a backplane (not shown). A microcontroller 210 manages the general operation of the system. In the illustrative embodiment, the microcontroller is a 32-bit model MCF5234 microcontroller available from Freescale Semiconductor Inc. As an alternative, a general purpose computer may be used instead of microcontroller 210. The microcontroller 210 is coupled to an audio switch 215 and a video switch 220 via a bus 218. The audio switch 215 and the video switch 220 are preferably crosspoint switches capable of switching a number of connections simultaneously. However many other types of switches capable of switching digital signals could be employed, for example Time Division Multiplexing (TDM) switches.

A mid plane 235 interconnects the switches and other devices to a variety of input and output modules such as, for example, Digital Video Input Modules with HDMI 600, Video Output Modules with HDMI 1000, Digital Audio Input Modules 400, and Digital Audio Output Modules 900. The mid plane 235 is further coupled to an Ethernet switch 230 that permits switching of 10 BaseT, 100 BaseT or Gigabyte Ethernet signals. The Ethernet switch 230 interconnects Ethernet ports 232 and a processing subsystem 240 to the microcontroller 210. In one embodiment, the processing subsystem 240 includes a plurality of small form factor general purpose personal computers that provide redundant operation and/or load balancing. In some embodiments, the processing subsystem 240 may include one or more storage devices, external to the personal computers, to provide expanded storage capacity, for example, to store digital media.

Also, a number of Universal Serial Bus (USB) ports 242 are interconnected to a USB hub 243 for interconnection to the processing subsystem 240. A memory card interface 225 may also be connected to the USB hub 243. The interface accepts one or more well known memory card formats, for example CompactFlash™ cards, Memory Stick™ cards, Secure Digital™ (SD) cards, or other formats. A USB switch 244 is employed to switch USB links among the multiple processing components that may be present. In a similar manner, a number of IEEE 1394 (FireWire™) ports 246 are interconnected to an IEEE 1394 hub 247 and to an IEEE 1394 switch 248.

The microcontroller 210 is further connected to a Serial Peripheral Interface (SPI) and Inter-Integrated Circuit ($I^2C$) distribution circuit 250, which provides a serial communication interface to relatively low data transfer rate devices. The SPI/$I^2C$ controller 250 is connected to the mid-plane connector 235 and thereby provides control commands from the microcontroller 210 to the modules and other devices in the programmable multimedia controller 100. Further connections from SPI/$I^2C$ controller 250 are provided to devices such as a fan controller 251, a temperature sensor 252 and a power manager circuit 253, which manage the thermal characteristics of the system and prevent overheating.

The microcontroller 210 is also connected to Infra-Red (IR) interface 260, an RS232 interface 265, and an RF interface 267, that permit interconnection with external devices. Such interaction permits programmable multimedia controller 100 to control external devices. In addition the interfaces may receive control signals that control the operation of the programmable multimedia controller itself. It is expressly contemplated that various other interfaces, including WI-FI, Bluetooth™, ZigBee™ and other wired and wireless interfaces, may be used with the multimedia controller 100.

In addition, an Auxiliary Audio/Video Port 700 is provided for interconnecting one or more video game systems, camcorders, computers, karaoke machines or other devices. A telephone interface 270 is provided for connecting to the PSTN or a private network, and to telephone handsets. Telephone interface 270 preferably includes FXS and FXO ports such that programmable multimedia controller 100 may directly connect with connect with telephone network 130 and conventional 2500 handsets, thereby effectively providing plain old telephone service (POTS) as well as acting as a private branch exchange (PBX).

Further, a device control interface 275 is provided to communicate with lighting, home automation, and motor and/or relay operated devices. As discussed in more detail below, an expansion port 280 is provided for linking several programmable multimedia controllers together to form an expanded system. Finally, a front panel display 1150 permits presentation of status, configuration, and/or other information to a user. In one embodiment the from panel can display video data originating from any input source connected to the system, such that one may preview video content on the display. In another embodiment the front panel display 1150 includes a touchscreen, and a user may enter control selections by selecting icons on the screen.

Figure 3:
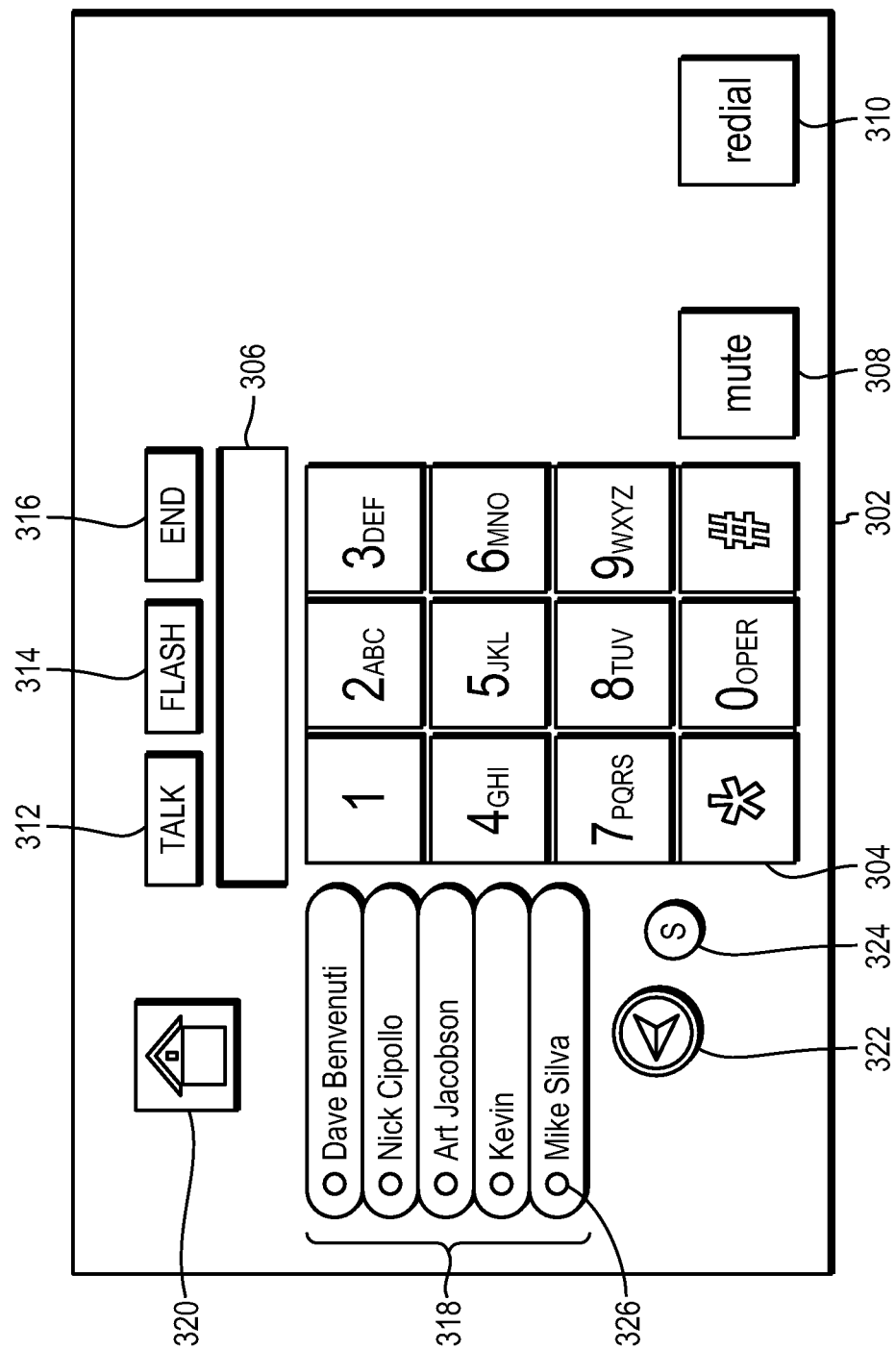
FIG. 3 shows a touchscreen configured as a virtual telephone with a keypad and controls displayed.

FIG. 3 shows a touchscreen 302 configured as a virtual telephone. It should be understood, however, that the services described below may be fully realized regardless of whether a touchscreen 302 is used as a virtual phone, a conventional handset is used with POTS, a television is used with a remote control, or a cell phone is used with commercially available equipment to capture dialed digits.

A keypad 304, whose keys are preferably arranged in the same manner as those of a conventional telephone handset, is displayed on the touchscreen and is responsive to a user's touch. A dialed number display 306 provides visual feedback to the user of digits as they are entered from keypad 304. A mute button 308 permits a user to switch between talk and mute modes. A redial button 310 permits a user to redial the last number dialed.

A talk button 312 permits a user to initiate an outgoing call to the telephone number which appears in display 306. A flash button 314 permits a user to perform a hook flash. An end button 316 permits a user to end a call. Display 318 represent a user interface to a smart phonebook incorporated within programmable multimedia controller 100. A user may scan a personal phonebook for contacts or may enter digits of a phone number using keypad 304. As digits are entered, display 318 is updated with potential matches. Once the correct entry appears in display 318, the user may simply press that entry to initiate the call.

A home button 320 permits a user to return to a home screen within the user interface hierarchy of touchscreen 302. A back button 322 permits a user to return to a previously displayed screen within the user interface hierarchy. A button 324 permits a user to change the skin or appearance of the background and buttons. Such changes may also occur automatically based on remote control enabled location-awareness and user profiles as discussed above. A status icon 326 provides a visual indication of the online status for the associated person. For example, if status icon 326 is red in color, it signifies that the associated person is not online. Conversely, if the status icon 326 is green, it signifies that the person is online. Also, because a given person may have multiple online "presences", status icon 326 may be used to indicate whether any of the presences is available.

Figure 4:
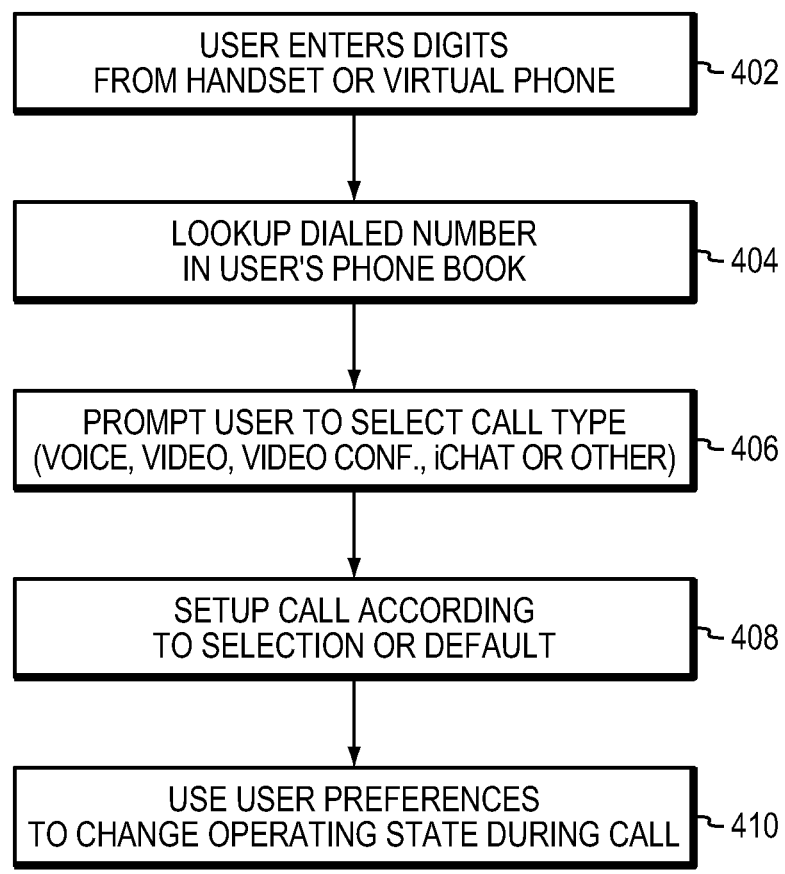
FIG. 4 is a flowchart showing the major steps of processing an outgoing telephone call using the multimedia controller of FIG. 1.

In general, the software necessary to generate the display on touchscreen 302 and underlying functionality may be created using Photoshop® in conjunction with the programming environment described in the above-referenced copending application entitled "Programmable Multimedia Controller With Programmable Services," filed Dec. 20, 2005, Ser. No. 11/314,112. Further, remote controls which enable location-awareness and user profile awareness allow a range of user experiences. For example, by knowing, through the user's use of a remote control, in which zone (room) a particular user was located, programmable multimedia controller 100 would know to use the television in that room for video calls or other information to be displayed, would know to display at display 318 the phonebook for that user and would know applicable settings or preferences for processing outgoing or incoming calls. FIG. 4 shows the major functional steps which may be performed when multimedia controller 100 is used to place a telephone call. At step 402, a user enters digits using a conventional telephone handset 132 (FIG. 1), a touchscreen 112 or 1150 which is configured as a virtual telephone or another appropriately enabled device. Multimedia controller 100 or, alternatively, a general purpose computer collects the entered digits and, at step 404, performs a lookup of the telephone number in a user's phonebook which is stored within controller 100. Based on a profile or settings which the user has previously entered into the phonebook for the dialed number, at step 406 the user is prompted (e.g., by appropriate display on touchscreen 112) to select a type of call. Depending upon the user's equipment as well as that of the party being called, a user may select a voice call (two party), a conference call (three or more parties), a video call (two party), a video conference (three or more parties), an iChat® call, an AOL Instant Messenger with video, text messaging or other type.

At step 408, in response to the user's selection or, alternatively, in accordance with a default call type, multimedia controller 100 sets up the outgoing call. At step 410, as the outgoing call is placed, multimedia controller 100 references previously entered user preferences or a profile to change its operating state. Examples of possible changes in the operating state are automatically turning down or muting the volume of any music or other audio which is playing; pausing any CD, DVD or other media which is playing; and displaying the phonebook entry or related information for the party who is being called.

Figure 5:
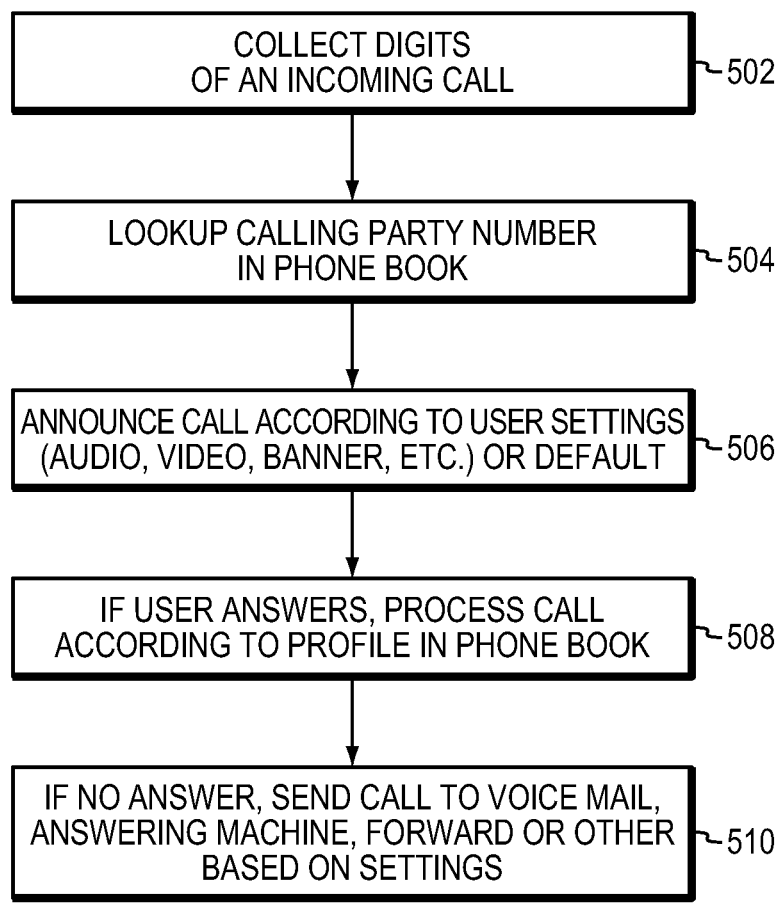
FIG. 5 is a flowchart showing the major steps of processing an incoming telephone call using the multimedia controller of FIG. 1.

FIG. 5 shows the major functional steps which may be performed when multimedia controller 100 is used to receive a telephone call. At step 502, controller 100 collects digits of an incoming call. At step 504, controller 100 performs a lookup of the calling party's telephone number with the phonebook stored within controller 100. At step 506, based on the results of the lookup or a default, controller 100 announces the incoming call. This announcement may be performed in any of several ways including audio (e.g., playing a user-selectable ring tone on a POTS telephone handset if the user prefers it or if no video display is turned on), video (e.g., displaying a user-selectable photo of the calling party), a banner (e.g., a caller ID, text message or similar notice is displayed on touchscreen 112 or another display, the choice and appearance of which may be automatically set based on location-awareness and user profiles as discussed above) or a preprogrammed or user-selected combination of the foregoing. As described in detail in co-ending application Ser. No. 11/314,112, programmable multimedia controller 100 is capable of displaying text or graphics overlaid on another video signal (e.g., broadcast or cable TV program, satellite program, DVD or other signal) which is being displayed on touchscreen 112, television 120 or other display which is interfaced with controller 100.

At step 508, if the user answers the incoming call, controller 100 processes the call according a profile or settings in the phonebook. Thus, the incoming call may be processed using any of the call types discussed above in connection with FIG. 4. Alternatively, at step 510, if there is no answer, the incoming call may be directed to voicemail, a virtual answering machine, forwarded or otherwise processed based on the user's profile or settings.

Figure 6:
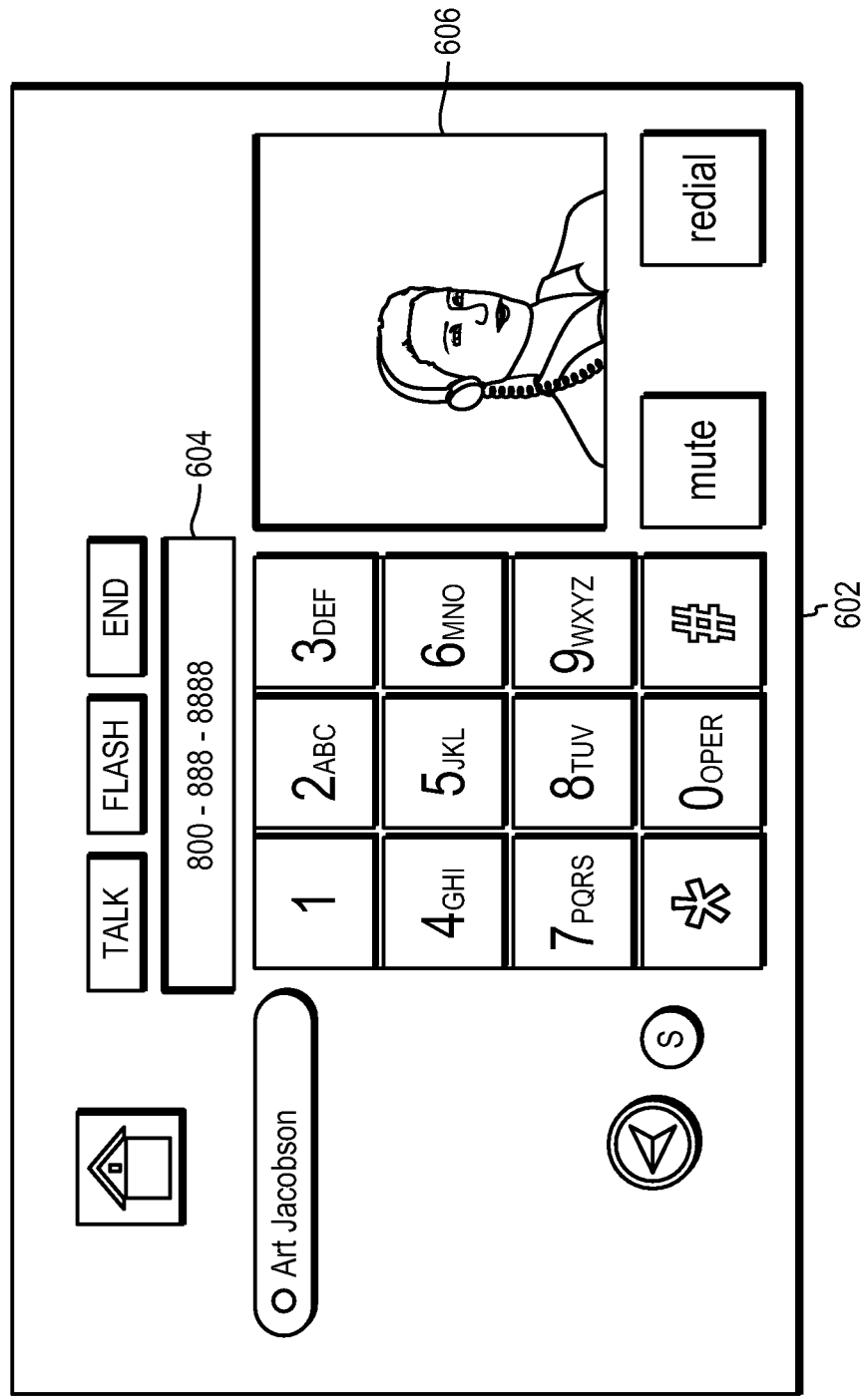
FIG. 6 shows a touchscreen display configured as a virtual telephone with a video call in progress.

FIG. 6 shows a touchscreen 602 configured as a virtual telephone with a video call in progress. Dialed number display 604 shows the telephone number of the current call. A video window 606 displays a video signal which is being received from the other party to the call. In the case of a video conference, touchscreen 602 may be used to display multiple video windows simultaneously.

Figure 7:
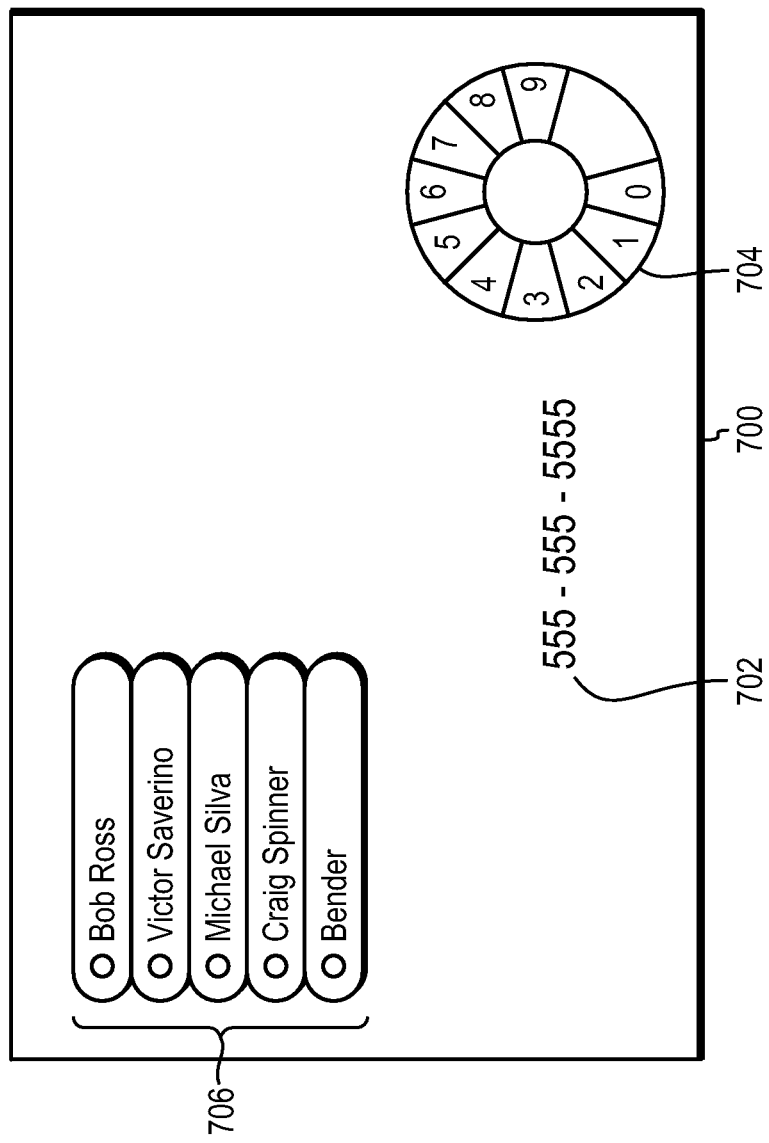
FIG. 7 show a television screen configured to operate in conjunction with the multimedia controller as a virtual telephone which a user controls with a simple remote control.

Referring again to FIG. 1, in an alternative embodiment, instead of using a touchscreen remote control 112, a user may wish to use a television 120 as the display for a virtual telephone which functions in the manner described above. In the absence of a touchscreen, user control may be provided by either a simple remote control 114 which communicates with multimedia controller 100 by way of IR or RF. Remote control 114 in conjunction with television 120 and an appropriate on screen display may be used to dial digits when making a call, enter text without the need for a keyboard or to perform any other necessary actions in connection with telephony services. As shown in FIG. 7, a television 120 (FIG. 1) has a screen 700 showing a dialed number display 702. Instead of a traditional telephone keypad, a circular dialing pad 704 is displayed. Display 706 is a user interface to a smart phonebook similar to that described above in connection with FIG. 3.

Circular dialing pad 704 is well adapted for use with a wireless scroll-ring type user remote control. Alternatively, user control may also be provided by way of an MP3 player or other device 116 which is capable of transmitting DTMF tones to programmable multimedia controller 100.

Figure 8:
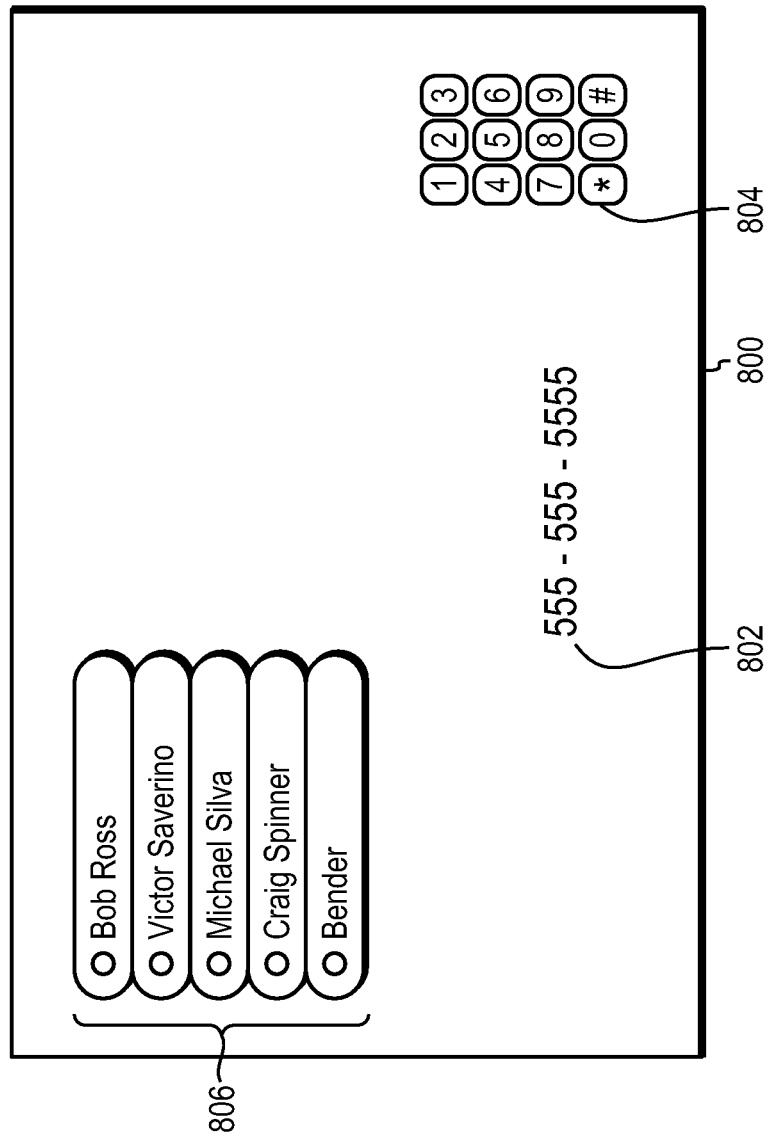
FIG. 8 shows a television screen configured to operate in conjunction with the multimedia controller as a virtual telephone which a user controls with a conventional telephone handset.

In accordance with another alternative embodiment, user control of a virtual telephone may be provided by way of a conventional telephone handset. As shown in FIG. 8, a television 120 has a screen 800 showing a dialed number display 802. A simulated telephone keypad 804 is also displayed on screen 800. Display 806 is a user interface to a smart phonebook similar to that described above in connection with FIG. 3.

The embodiment of FIG. 8 may be advantageously used in connection with a traditional telephone handset 132 (FIG. 1) which is connected to programmable multimedia controller 100. For example, when a user lifts the handset offhook, multimedia controller 100 responsively causes screen 800 to display keypad 804. If desired, an interactive voice response (IVR) service may be implemented in which user prompts are delivered by a speech synthesizer and user responses are interpreted by a speech recognizer, both capabilities being available within Mac OS X as well as from other commercial sources.

As a user enters DTMF digits, they are collected by multimedia controller 100 and displayed in dialed number display 802. Once a call is setup, regardless of whether it is completed using a traditional telephony signaling protocol, voice over IP (VoIP), iChat or video, the user simply uses handset 132 to speak with the other party. In the case of video calls or conferences, a video image may be captured by a separate video camera 124 or, alternatively, by a video camera which is built into television 120. In this fashion, a user may fully use and enjoy a wide range of advanced telephony features and functions provided by multimedia controller 100 without having to learn complex technology, arcane commands or abstract computer concepts.

The foregoing description has been directed to particular embodiments of this disclosure. It will be apparent, however, that other variations and modifications may be made to the described embodiments, with the attainment of some or all of their advantages. Additionally, the procedures or processes described above may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A system comprising:
a programmable multimedia controller configured to control a plurality of electronic devices, the plurality of electronic devices including a plurality of display devices;
a remote control configured to communicate with the programmable multimedia controller;
an on screen display configured to be displayed on a selected one of the plurality of display devices, the on screen display to enable the selected one of the plurality of display devices to function as part of a virtual telephone that is user-operable to initiate outgoing telephone calls and to answer incoming telephone calls, and when an outgoing telephone call or incoming telephone call is in progress to show text or graphics related to the outgoing telephone call or the incoming telephone call,
wherein the programmable multimedia controller is configured to select the selected one of the plurality of display devices based on a location of the remote control, the selected one of the plurality of display devices to be a display device in a zone in which the remote control is located, and to cause the on screen display to be overlaid on another video signal which is already being displayed on the selected one of the plurality of display devices.

2. The system of claim 1, wherein the another video signal is a broadcast, cable or satellite television (TV) program.

3. The system of claim 1, wherein the on screen display includes a banner including a notice regarding the outgoing telephone call or incoming telephone call, the notice including at least one of a phonebook entry for a called party or caller identity (ID) information for a calling party.

4. The system of claim 1, wherein the selected one of the plurality of display devices is a television within in the zone in which the remote control is located.

5. The system of claim 1, wherein the remote control is an electromechanical remote control that communicates with the programmable multimedia controller using, at least in part, infra red (IR) or radio frequency (RF) communication and is separate from the selected one of the plurality of display devices, and the programmable multimedia controller is configured to cause the on screen display to be responsive to input entered on the electromechanical remote control.

6. The system of claim 1, wherein the remote control is a touch screen remote control.

7. The system of claim 1, wherein the remote control is a plain old telephone service (POTS) telephone handset separate from the selected one of the plurality of display devices, and the programmable multimedia controller is configured to cause the on screen display to be responsive to input entered on the POTS telephone handset.

8. The system of claim 1, wherein the outgoing telephone call or the incoming telephone call is an incoming telephone call, and the text or graphics include an announcement announcing the incoming telephone call.

9. The system of claim 1, wherein the outgoing telephone call or the incoming telephone call is an incoming telephone call that has a call type of voice, voice conference, video, or video conference, and
wherein the call type is based at least in part on a called party.

10. A method comprising:
using a programmable multimedia controller to control a plurality of electronic devices, the plurality of electronic devices including a plurality of display devices;
determining a zone in which a remote control associated with the programmable multimedia controller is located;
generating an on screen display, the on screen display capable of being displayed on any of the plurality of display devices, the on screen display to enable a display device to function as part of a virtual telephone that is user-operable to initiate outgoing telephone calls and to answer incoming telephone calls, and when an outgoing telephone call or incoming telephone call is in progress to show text or graphics related to the outgoing telephone call or the incoming telephone call; and
causing, by the programmable multimedia controller, the on screen display to be displayed on a selected one of the plurality of video display devices, wherein the selected one of the plurality of display devices is selected based on a zone in which the remote control is located.

11. The method of claim 10, wherein the selected one of the plurality of video display devices is a television located within the zone in which the remote control is located.

12. The method of claim 10, wherein the remote control is an electromechanical remote control separate from the selected one of the plurality of video display devices, and the on screen display is responsive to input entered on the electromechanical remote control.

13. The method of claim 10, wherein the remote control is a plain old telephone service (POTS) telephone handset separate from the selected one of the plurality of video display devices, and the on screen display is responsive to input entered on the electromechanical remote control.

14. The method of claim 10, wherein the causing further comprises:
overlaying the on screen display on another video signal which is already being displayed on the selected one of the plurality of display devices.

15. The method of claim 14, wherein the another video signal is a broadcast, cable or satellite television (TV) program.

16. The method of claim 10, wherein the outgoing telephone call or the incoming telephone call is an incoming telephone call, and the text or graphics comprise an announcement related to the incoming telephone call.

17. A method for providing telephony services comprising:
using a programmable multimedia controller to control a plurality of electronic devices, the plurality of electronic devices including a plurality of display devices;
determining a zone in which a remote control configured to communicate with the programmable multimedia controller is located;
select one of the plurality of display devices that is in the zone in which the remote control is located;
providing a user interface that functions as a virtual telephone and that is user-operable to initiate outgoing telephone calls and to answer incoming telephone calls, an on screen display of the user interface displayed on the selected one of the display devices;
in response to a user initiating an outgoing telephone call, comparing a number of a called party for the outgoing call with one or more previously stored numbers;
when the number matches a previously stored number, processing the outgoing telephone call based upon a profile associated with the matching stored number; and
changing one or more operating states of the programmable multimedia controller based on the profile associated with the matching stored number, the operating states of the programmable multimedia controller to adjust at least one other signal to avoid disturbance of the call.

18. The method of claim 17, wherein the at least one other signal includes an audio signal and the adjusting is muting the audio signal.

19. The method of claim 17, wherein the on screen display includes a banner including a notice regarding the outgoing telephone call or incoming telephone call, the notice including at least one of a phonebook entry for a called party or caller identity (ID) information for a calling party.

20. The method of claim 17, further comprising:
overlaying the on screen display on another video signal which is already being displayed on the selected one of the plurality of display devices, wherein the another video signal is a broadcast, cable or satellite television (TV) program.

21. A system comprising:
a programmable multimedia controller configured to control a plurality of electronic devices, the plurality of electronic devices including a plurality of display devices;
a remote control configured to communicate with the programmable multimedia controller, the remote control separate from the plurality of display devices;
an on screen display configured to be displayed on a selected one of the plurality of display devices, the on screen display to enable the selected one of the plurality of display devices to function as part of a virtual telephone that is user-operable to initiate outgoing telephone calls and to answer incoming telephone calls, and when an outgoing telephone call or incoming telephone call is in progress to show text or graphics related to the outgoing telephone call or the incoming telephone call,
wherein the programmable multimedia controller is configured to select the selected one of the plurality of display devices based on a location of the remote control, the selected one of the plurality of display devices to be a display device in a zone in which the remote control is located, and to cause the on screen display to be displayed on the selected one of the plurality of video display devices.

22. The system of claim 21, wherein the on screen display includes a banner including a notice regarding the outgoing telephone call or incoming telephone call, the notice including at least one of a phonebook entry for a called party or caller identity (ID) information for a calling party.

23. The system of claim 21, wherein the selected one of the plurality of display devices is a television within in the zone in which the remote control is located.

24. The system of claim 21, wherein the outgoing telephone call or the incoming telephone call is an incoming telephone call, and the text or graphics include an announcement announcing the incoming telephone call.

* * * * *